(12) United States Patent
Mireles

(10) Patent No.: US 10,517,460 B2
(45) Date of Patent: Dec. 31, 2019

(54) DEVICE FOR DISINFECTING AND CLEANING PARTS OF PERSONS, ANIMALS AND OBJECTS

(71) Applicant: Tony Mireles, Las Vegas, NV (US)

(72) Inventor: Tony Mireles, Las Vegas, NV (US)

(*) Notice: Subject to any disclaimer, the term of this patent is extended or adjusted under 35 U.S.C. 154(b) by 0 days.

(21) Appl. No.: 15/657,226

(22) Filed: Jul. 24, 2017

(65) Prior Publication Data

US 2019/0021575 A1    Jan. 24, 2019

(51) Int. Cl.
*A47L 23/26* (2006.01)
*B01D 39/16* (2006.01)
*A47L 23/22* (2006.01)

(52) U.S. Cl.
CPC .............. *A47L 23/26* (2013.01); *B01D 39/16* (2013.01); *A47L 23/22* (2013.01); *B01D 2239/0442* (2013.01)

(58) Field of Classification Search
CPC ....................................................... A47L 23/26

USPC ........................................................ 422/292
See application file for complete search history.

(56) References Cited

U.S. PATENT DOCUMENTS

| | | | | |
|---|---|---|---|---|
| 2008/0034485 | A1* | 2/2008 | McClelland | A47K 17/00 4/300 |
| 2016/0198790 | A1* | 7/2016 | Ishmael | A41D 13/06 2/239 |
| 2017/0007464 | A1* | 1/2017 | Liu | C09J 133/14 |
| 2018/0153372 | A1* | 6/2018 | Latteri | A61L 2/23 |

* cited by examiner

*Primary Examiner* — Kevin Joyner
(74) *Attorney, Agent, or Firm* — Gokalp Bayramoglu

(57) ABSTRACT

The invention provides a device for disinfecting and cleaning parts of persons, animals and objects which includes a plurality of sheets and a plurality of substrate layers. Each substrate layer is disposed between two sheets. Each sheet includes an adhesive layer and an antibacterial layer. A tab is arranged on each sheet. The invention can remove the dirt from a foot or paw as well as gently disinfect the foot or paw. Dirt, lint, hair, dust, and germs can be removed from the foot or paw using a gentle, antibacterial, sticky sheet on which the individual steps on.

19 Claims, 4 Drawing Sheets

DEVICE FOR DISINFECTING AND CLEANING PARTS OF PERSONS, ANIMALS AND OBJECTS

TECHNICAL FIELD

This disclosure relates to the field of sanitary technology and particularly to a device for disinfecting and cleaning parts of persons, animals and objects.

BACKGROUND

As is well known, the primary route by which communicable diseases are transmitted is from individual to individual. The ease of transmissibility of pathogens and germs, as well as the debilitating diseases caused by the pathogens and germs cause concern for most people.

People who walk with bear feet through dirty floors, the ground, carpets, outdoors, tiles, etc. may pick up pathogens on their feet from these surfaces, namely, bacteria and viruses. Most people have the common habit of stepping on the floor with bare feet. Sometimes, people need to go to the bathroom in the middle of the night or in the middle of a sleep cycle, so they exit and reenter the bed with their bare feet stepping on the floor. Once returning the bed, it is likely that the person will reenter the bed with dirt, hair, lint, and germ pathogens on their feet. Similarly, the outside environment upon which people walk such as streets, sidewalks, grass, etc. are heavily contaminated with animal feces, litter, and other forms of potentially harmful microorganisms. When the person gets back indoors, the contamination carried by footwear can enter a house, such that unclean feet or footwear will bring microorganisms such as bacteria into the home environment.

At the airport, passengers frequently need to take off their shoes to go through safety/security checkpoints. The passenger's feet may be contaminated by the bacteria on the floor. Since the airport is a high traffic place, the passenger will put their shoes back on in a hurry after the search is completed. However, there is no effective solution to clean one's feet at the airport before passengers put their shoes back on.

In some public places, such as motels, hotels, shopping malls, hospitals and so on, customers enter and leave frequently. It is not practical to clean the floor all the time. Bacteria may be easily and readily transferable between individuals.

For people who keeps pets, it is favorable to take their pets outside from time to time. However, Staph, Mersa, fecal matter, *E. coli* bacteria, dirt, etc. may be carried by the pet animals' paws from the outside environment. If disinfection is not sufficiently performed for the pet when it gets into the house, a number of debilitating conditions caused by pathogens, and infections may be spread to the people in the home. However, currently there is no method by which pet paws are treated on a regular basis to reduce such transmissibility of disease.

Accordingly, there is a need in the art for an inexpensive device and procedure by which a foot/paw can be cleaned before entering a room. Floors, ground, tiles, can be protected from serving as a transmissible source of communicable disease-causing pathogens.

There is a further need in the art for a simple device and procedure, that substantially reduces the probability by which an individual can become infected with a disease-causing pathogen such as viruses.

There is still further a need in the art for such a device and procedure that is easy to use and readily deployed. The device can be utilized with virtually all types of floors, carpets, ground, airports, motels, hotels, hospitals, houses, etc.

SUMMARY

The invention provides a device for disinfecting and cleaning parts of persons, animals and objects.

In one aspect, a device for disinfecting and cleaning parts of persons, animals, and objects includes a plurality of functional units, each of the plurality of functional units includes a sheet and a substrate layer. Each sheet includes an adhesive layer and an antibacterial layer.

In one aspect, each of the plurality of functional units further includes a tab.

In one aspect, the substrate layer is made of wax paper.

In one aspect, the number of the plurality of functional units is less than 10.

In one aspect, the plurality of sheets is made of material selected from the group consisting of plastic, paper, fabric, foil, and metal In one aspect, the antibacterial layer includes one or more antibacterial disinfection agents.

In one aspect, the tab is made of material selected from the group consisting of plastic, paper, fabric, foil, and metal.

In one aspect, the shape of the sheet is selected from the group consisting of circle, oval, triangle, and polygon.

In one aspect, the adhesive layer and the antibacterial layer are integratedly formed in one layer.

The intended purpose is to clean feet, but not limited to only human feet. The invention can also be used to clean pet's paws at the door, but is not limited to animals' paws. The device of the invention can be put in front of doors or at bedside of one's bed. The device of the invention is ready to clean a passenger's feet or footwear by simply stepping on it with one's bare feet or footwear. The antibacterial adhesive layer will pull off the dirt and or germs of the feet of a human and or paws of the pet. The adhesive layer can clean the human foot to remove dirt, lint, hair, germ, pathogen, before entering your bed or after removing your shoes at an airport or a hospital. Also, the adhesive layer can remove fecal matter and dirt caught up in the animal's paws. The antibacterial disinfection layer could stop germ pathogens such as Mersa, Staph, and other infection germs that may be collected on people's bare feet from large crowds of people which is known to create and spread germ pathogens.

BRIEF DESCRIPTION OF THE DRAWINGS

Features and purposes of the invention will be clarified by the examples illustrated in the following figures.

DETAILED DESCRIPTION

Hereinafter, the invention will be further described in conjunction with the accompanying figures and embodiments. However, the detailed description as set forth below with reference to the appending drawings should be construed as exemplary and preferred embodiments of the invention and cannot be used to limit the scope of the invention improperly. The description that sets forth the functions and sequences of steps of operation is for the purpose of illustration. It is understood, however, that the same or equivalent functions and sequences may be accomplished by different embodiments and that they are also intended to be encompassed within the scope of this invention.

Figure 1:
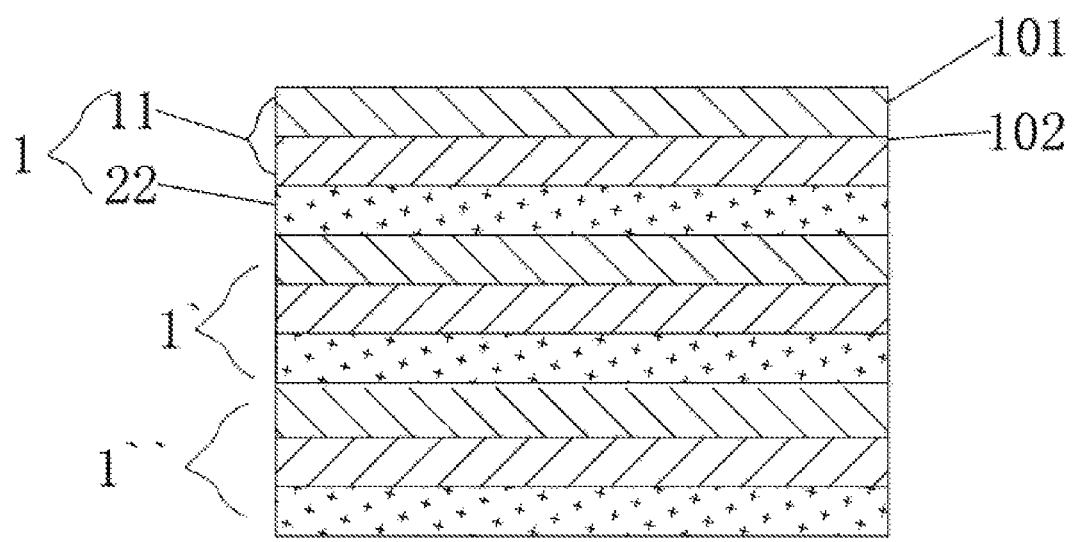
FIG. 1 is a schematic diagram of a cross sectional view of the device for disinfecting and cleaning parts of persons, animals and objects of one embodiment of the invention.

Referring to FIG. 1, a device for disinfecting and cleaning parts of persons, animals and objects of the invention includes a plurality of functional units 1, 1', 1". Each functional unit 1 includes sheet 11 and substrate layer 22. Sheet 11 is on top of substrate layer 22. Sheet 1 can be made of any suitable material, for example, plastic, paper, fabric, foil, metal, etc. Preferably, the number of functional units 1 may be less than 10. Each sheet 1 includes adhesive layer 101 and antibacterial layer 102. Adhesive layer 101 includes one or more adhesive agents. Antibacterial layer 102 includes one or more mild antibacterial disinfection agents. Adhesive layer 101 and antibacterial layer 102 can be formed as an integrated layer. Substrate layer 22 prevents the adhesive layer 101 from sticking to the next sticky adhesive layer 101. Preferably, the substrate layer is made of wax paper.

Figure 2:
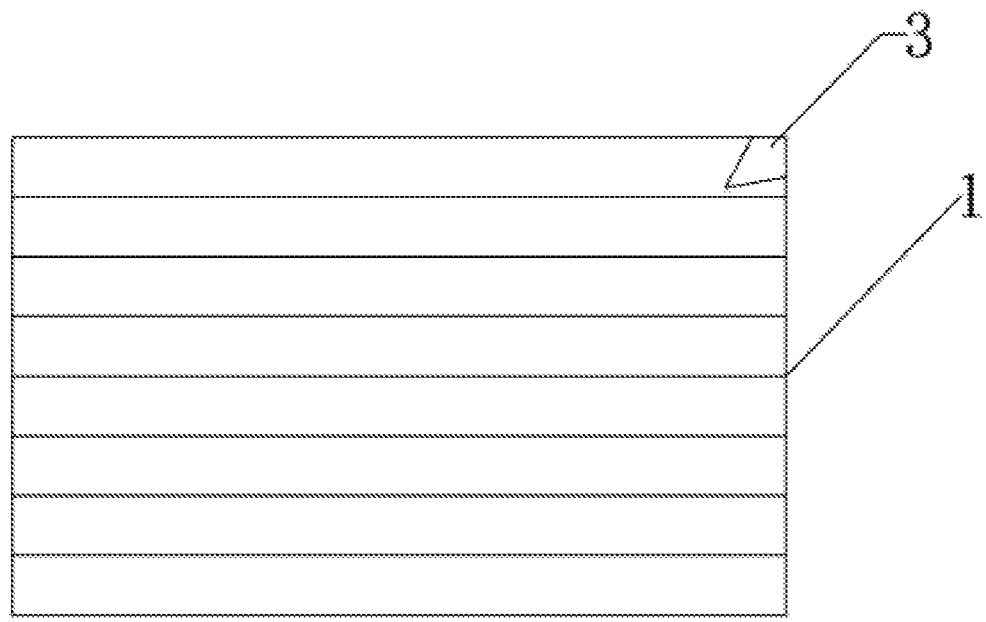
FIG. 2 is a schematic diagram of a cross sectional view of the device for disinfecting and cleaning parts of persons, animals and objects of one embodiment of the invention.

Referring to FIG. 2, each sheet 1 further includes tab 3 at one corner. Tab 3 facilitates the user to peel off sheet 1, once the prior sheet is dirty and or no longer sticky. Tab 3 can be a conventional tab which is connected to sheet 1. Also, tab 3 can be part of sheet 1. Tab 3 can be made of any suitable material, for example, plastic, paper, fabric, foil, metal, etc. There can be more than one tabs.

Figure 3:
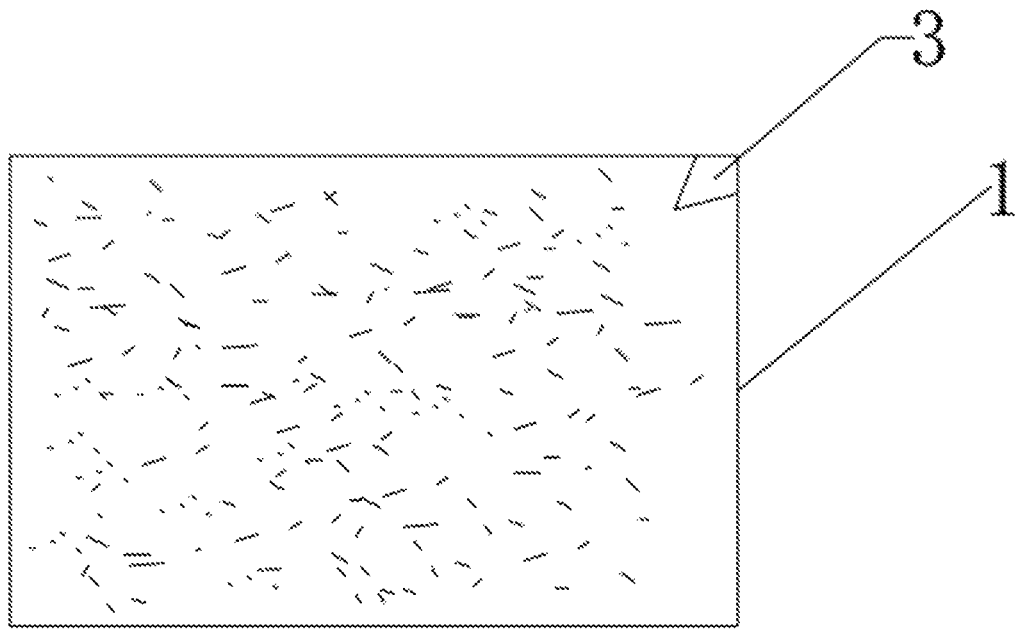
FIG. 3 is a schematic diagram of a top view of the device for disinfecting and cleaning parts of persons, animals and objects of one embodiment of the invention.

Referring to FIG. 3, tab 3 is arranged at the upper right corner of sheet 1. In FIG. 3, sheet 1 is in the shape of rectangle. However, the shape of sheet 1 can be other shapes including circle, oval, triangle, polygon, etc., and is not limited to rectangle. In FIG. 3, tab 3 is on the upper right corner of sheet 1. However, tab 3 can be arranged at any portion of sheet 1, for example, the edge, the middle, or other corners.

Figure 4:
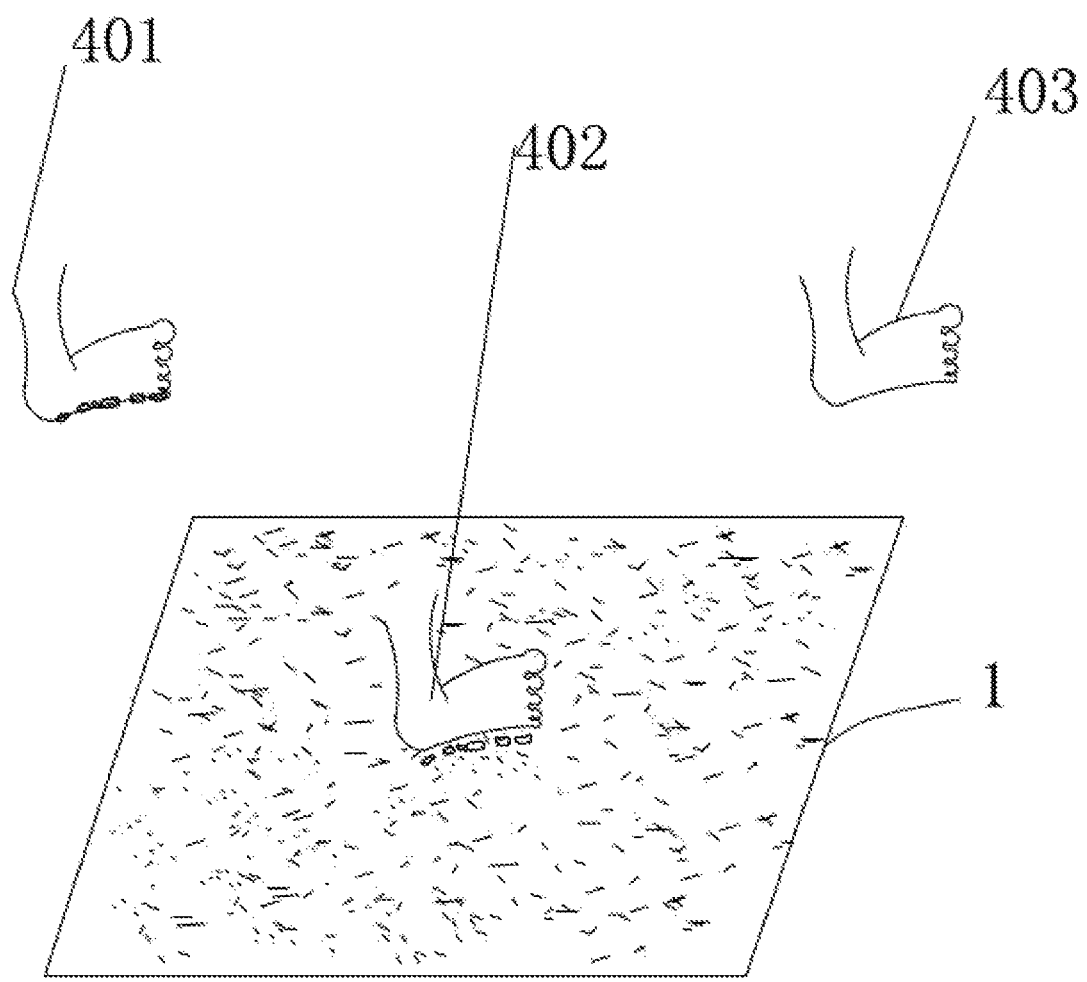
FIG. 4 is a schematic diagram of a perspective view of the device for disinfecting and cleaning parts of persons, animals and objects of one embodiment of the invention, showing the procedure of how a dirty foot is cleaned and disinfected by the device of the invention and become a clean foot.

FIG. 4 shows the procedure for disinfecting the dirty foot of a human. Referring to FIG. 4, dirty foot 401 of a person is trying to get into the room or a certain area. When foot 402 is stepping on sheet 1, the device for disinfecting and cleaning parts of persons, animals and objects of the invention can clean and disinfect foot 402. Germs and pathogens are killed by antibacterial layer 102, while dirt, hair, lint, debris, etc. are captured by adhesive layer 101. Then, the person with clean foot 403 can get into the room or area without bringing bacteria or dirt. In FIG. 4, the foot of a human is cleaned and disinfected. However, the device of the invention is not limited to clean the foot, but can also be used to clean other parts of the human, for example, hands, arms, heads, legs, etc.

The procedure for disinfecting the paw or other parts of an animal/pet by device for disinfecting and cleaning parts of persons, animals and objects of the invention is the same.

The procedure for disinfecting an object passing through the device for disinfecting and cleaning parts of persons, animals and objects of the invention is the same.

With the invention, a sticky gentle antibacterial pad is provided on which the user steps on after removing his or her shoes at an airport, a hospital, a motel, a hotel, or after entering her home, or before lying in her bed, to ensure that the feet of the user are clean and disinfected.

After one sheet is dirty, the user simply pulls the sheet away and another sheet is ready to be used. A wax paper is used as the substrate layer which allows the following sheet once pulled from the tab not to stick to the next sheet. A tab can be pulled back once the pad is dirty and no longer sticky.

This product will remove the dirt from one's feet as well as gently disinfect the feet. Dirt, lint, hair, dust, and germs can be removed from the user's feet using a gentle, antibacterial, sticky sheet on the mat on which the person step on.

When the pets reenter the home from the outside with dirty paws that may be carrying *E. coli* or any other pathogen germs along with dirt or fecal matter, the device of the invention can eliminate these factors collected on pets' paws. Thus, by using this product, chances of contacting or spreading germs, pathogens, dirt, hair, and lint can be significantly decreased.

Having thus described the disclosure of the present application in detail and by reference to implementations thereof, it will be apparent that modifications and variations are possible without departing from the scope of the disclosure defined in the appended claims.

What is claimed is:

1. A device located on a ground such that footwear, feet or paws step on the device, and step off the device wherein the footwear, the feet or the paws are disinfected and cleaned and the device comprises:
   a plurality of functional units;
      wherein the plurality of functional units are overlapped onto one another;
      each of the plurality of functional units consists of a sheet and a substrate layer;
      the sheet is on top of the substrate layer, and
      the sheet includes an adhesive layer for cleaning and an antibacterial layer for disinfection wherein the adhesive layer is located on top of the antibacterial layer and the substrate layer prevents the adhesive layer from sticking to a next adhesive layer;
      wherein the antibacterial layer kills germs and pathogens, and
      the adhesive layer includes one or more adhesive agents and is exposed to the atmosphere, the adhesive layer is configured to remove dirt, lint, hair, debris, germs or pathogens when the footwear, the feet or the paws step on the adhesive layer.

2. The device of claim 1, wherein each of the plurality of functional units further includes a tab.

3. The device of claim 2, wherein the tab is made of material selected from the group consisting of plastic, paper, fabric, foil, and metal.

4. The device of claim 2, wherein the substrate layer is made of wax paper.

5. The device of claim 1, wherein the substrate layer is made of wax paper.

6. The device of claim 1, wherein the number of the plurality of functional units is less than 10.

7. The device of claim 1, wherein the sheet is made of material selected from the group consisting of plastic, paper, fabric, foil, and metal.

8. The device of claim 1, wherein the antibacterial layer includes one or more antibacterial disinfection agents.

9. The device of claim 1, wherein the shape of the sheet is selected from the group consisting of rectangle, circle, oval, triangle, and polygon.

10. A device located on a ground such that footwear, feet or paws step on the device, and step off the device wherein the footwear, the feet or the paws are disinfected and cleaned and the device comprises:
   a plurality of functional units;
      wherein the plurality of functional units are overlapped onto one another;
      each of the plurality of functional units consists of a sheet and a substrate layer;
      wherein the substrate layer is made of wax paper;
      the sheet is on top of the substrate layer, and
      the sheet includes an adhesive layer for cleaning and an antibacterial layer for disinfection and the adhesive layer is located on top of the antibacterial layer and the substrate layer prevents the adhesive layer from sticking to a next adhesive layer;
      wherein the antibacterial layer kills germs and pathogens; and
      the adhesive layer includes one or more adhesive agents and is exposed to the atmosphere, the adhesive layer is configured to remove dirt, lint, hair, debris, germs or pathogens when the footwear, the feet or the paws step on the adhesive layer.

11. The device of claim 10, wherein each of the plurality of functional units further includes a tab.

12. The device of claim 11, wherein the tab is made of material selected from the group consisting of plastic, paper, fabric, foil, and metal.

13. The device of claim 10, wherein the number of the plurality of functional units is less than 10.

14. The device of claim 10, wherein the sheet is made of material selected from the group consisting of plastic, paper, fabric, foil, and metal.

15. The device of claim 10, wherein the antibacterial layer includes one or more antibacterial disinfection agents.

16. The device of claim 10, wherein the shape of the sheet is selected from the group consisting of rectangle, circle, oval, triangle, and polygon.

17. The device of claim 10, wherein the adhesive layer removes fecal matter and the dirt from the paws.

18. The device of claim 10, wherein the adhesive layer cleans the footwear or the feet.

19. The device of claim 10, wherein the adhesive layer includes two or more adhesive agents.

* * * * *